UNITED STATES PATENT OFFICE.

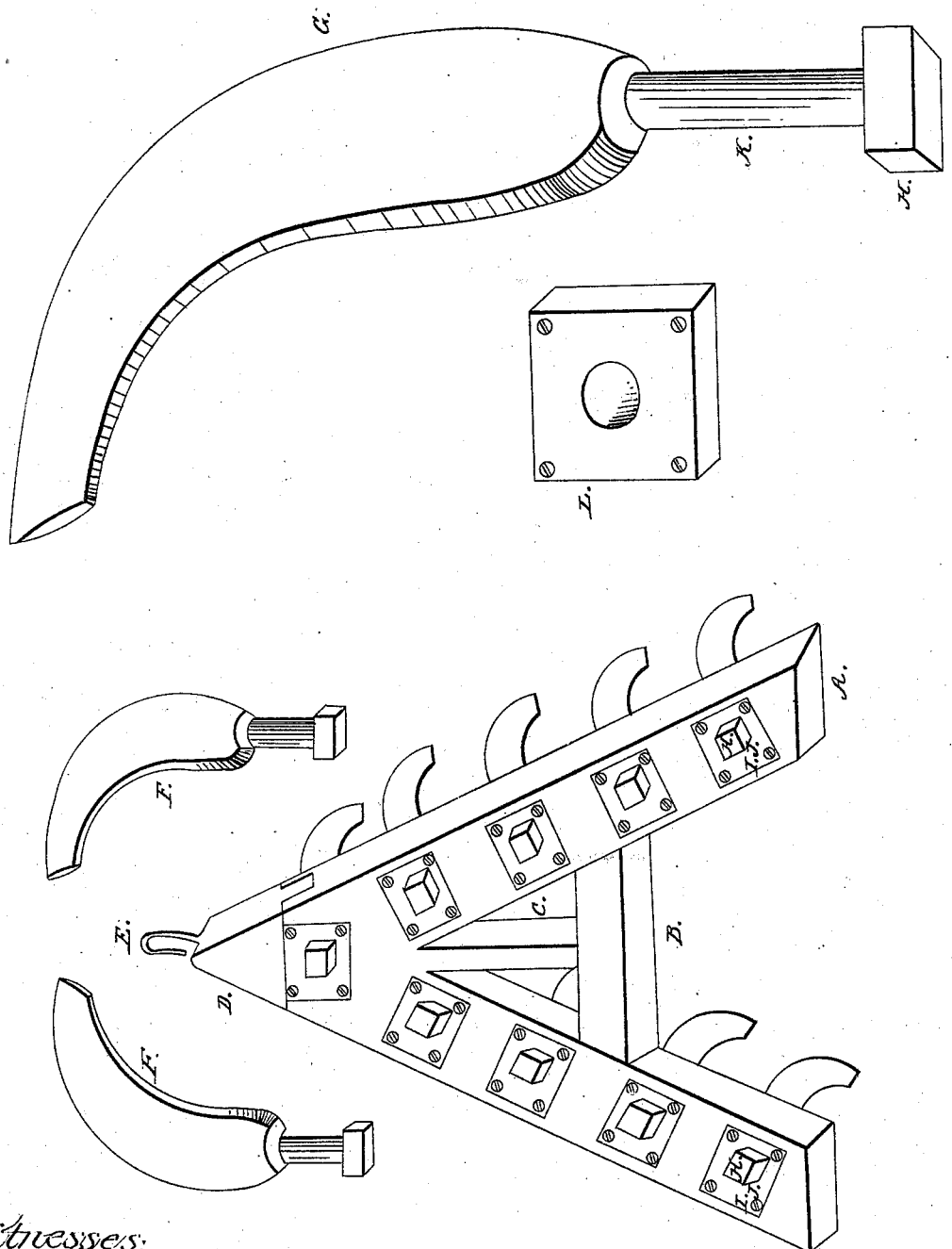

DENNIS RICE, OF ROWE, MASSACHUSETTS.

IMPROVEMENT IN SWARD-CUTTING HARROWS.

Specification forming part of Letters Patent No. 3,589, dated May 17, 1844.

*To all whom it may concern:*

Be it known that I, DENNIS RICE, of Rowe, in the county of Franklin and Commonwealth of Massachusetts, have invented a new and useful Harrow, called the "Sward-Cutter Harrow;" and I do hereby declare that the following is a full and exact description.

I construct a frame-work, A A, of wood in the form of a common harrow, with a crossbeam, B, and center piece, C, from the crosspiece to the apex of the harrow. The framework should consist of slit-work four inches by six and about six feet long. The apex should be capped with an iron cap, D, with a swivel-hook, E, for the chain. The iron cap is to strengthen the wood part of the swivel, to enable the harrow being turned with ease. The teeth F of the harrow are made of cast or wrought iron and in form of a bill-hook, the outer curve, G, of which is brought to an edge, with a shank, K, or pivot on the upper end, to enable the tooth to turn in a socket placed in the wood frame. The teeth should be about one and three-fourths of an inch thick at the shoulder or at the pivot. The pivot should be about one and a half inch in diameter, and sufficiently long to reach through the woodwork, with a nut or pin, H, at the end. The teeth should be made in form of a colter, in thickness tapering from the shoulder to the point.

There are to be two iron sockets, I J, to each tooth, one, I, set into the wood-work of the harrow on the under side, and the other, J, into the wood on the upper side, so that the tooth may revolve in the sockets, fastened by a screw-nut or pin, H, on the top of the pivot. The socket should be raised in the center L, and about an inch thick in the center and about three or four inches square.

The teeth may vary in size and length and number according to the wishes of the user, and, if desired, the teeth may be made stationary in the harrow by means of a square socket; but it is supposed that the revolving teeth will be much the most useful. The utility of this harrow, when the parts are constructed as above described and put together, consists in the free and easy use of the harrow; the teeth revolving in the sockets prevents the breaking of them when turning around with the team which draws the same; the facility with which the sward is cut and the surface of the ground loosened. By this instrument the roots of the grass that have become thick and matted can be separated and loosened, so as to give room for new shoots, and at the same time leave the surface of the ground even; and it is believed that the breaking up of green sward may be rendered much more easy by the use of this harrow before using the plow, and after plowing it can be used to great advantage in cutting up the turf; and it is also believed that it is much preferable to the common harrow in harrowing in grain, the operation of it being to sever the sods instead of dragging them along with the harrow, and avoiding stones and other obstacles by means of the revolving teeth.

What I claim is—

The mode herein described of constructing the sward-cutter harrow—that is to say, by using and combining with the harrow-frame a suitable number of movable harrow-teeth of the above description, for the purposes specified.

DENNIS RICE.

Witnesses:
SAMUEL H. REED,
JOHN C. DRURY.